United States Patent
Graham

[19]

[11] Patent Number: 5,940,620
[45] Date of Patent: Aug. 17, 1999

[54] COMPILER WITH INTERMEDIATE COMPILING MECHANISM

[75] Inventor: Marvin L. Graham, West Columbia, S.C.

[73] Assignee: NCR Corporation, Dayton, Ohio

[21] Appl. No.: 08/814,173

[22] Filed: Mar. 7, 1997

[51] Int. Cl.⁶ .................................................. G06F 9/45
[52] U.S. Cl. ............................................................ 395/707
[58] Field of Search ............................................. 395/707

[56] References Cited

U.S. PATENT DOCUMENTS

| | | | |
|---|---|---|---|
| 4,667,290 | 5/1987 | Goss et al. | 395/707 |
| 5,355,492 | 10/1994 | Frankel et al. | 395/707 |
| 5,375,242 | 12/1994 | Kumar et al. | 395/707 |
| 5,396,631 | 3/1995 | Hayashi et al. | 395/707 |
| 5,404,531 | 4/1995 | Wakatani | 395/707 |
| 5,442,790 | 8/1995 | Nosenchuck | 395/707 |
| 5,586,328 | 12/1996 | Caron et al. | 395/705 |
| 5,606,697 | 2/1997 | Ono | 395/707 |
| 5,701,489 | 12/1997 | Bates et al. | 395/705 |

*Primary Examiner*—Robert W. Downs
*Assistant Examiner*—Wei Zhen
*Attorney, Agent, or Firm*—Gerard M. Wissing

[57] ABSTRACT

A compiler which facilitates wide compilation functions using an intermediate compile mechanism that performs wide compilation functions without changing existing program makefiles. The intermediate compile mechanism supports cross-module inline substitutions and passing of arguments in registers, to improve execution times of executable programs.

10 Claims, 4 Drawing Sheets

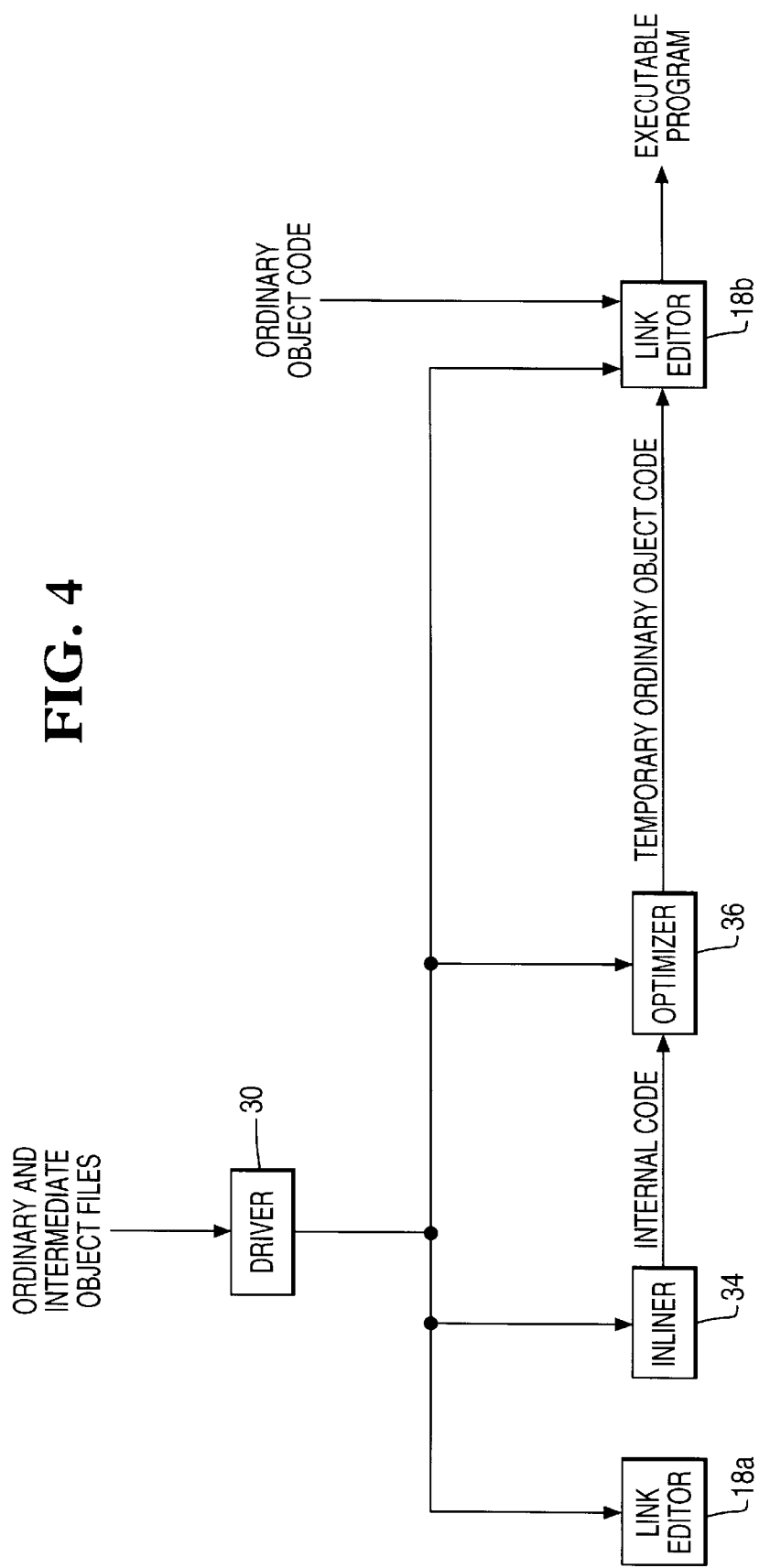

COMPILER WITH INTERMEDIATE COMPILING MECHANISM

BACKGROUND

1. Field of the Invention

The present application relates to a compiler which facilitates wide compilation functions. More particularly, the present application provides an intermediate compiler mechanism embedded in the compiler that performs wide compilation functions without changing program makefiles.

2. Description of the Related Art

Computers users typically use translators to get programs written in high-level programming languages executed by the computer. Translators are typically defined as language processors that accept source code as an input and produce as an output functionally equivalent programs, i.e., object code which can then be linked by a link editor to form executable program code. One example of a commonly used translator is a compiler which translates high-level source code into machine language object code. Early compilers were capable of translating source code from single source files to object code. Compiler vendors are continuously trying to improve execution times of programs using various techniques. One such technique developed is a "wide compile" technique. The advantageous feature of wide compiles is that several program modules presented to the compiler are compiled together. Wide compiles support inline substitutions and argument passing in registers between functions whose source code is in several different modules.

Generally, inline substitution replaces a function call in the source code with the body of the function. This reduces execution times by avoiding the need for argument passing and by permitting other optimizations to be performed across the body of the function that is put inline.

Generally, when wide compiling, if the inliner sees function arguments that are to be passed between functions in different modules, the compiler can generate code that stores those arguments in registers instead of memory. For example, if the inliner sees two arguments to be passed from one function to another, one would be stored in one register and the other argument would be stored in another register. As a result, the time to store and retrieve the arguments is reduced significantly when compared to the storing and retrieving of arguments from memory.

However, many compiler users have apparently decided not to adopt the wide compile technique because current software building processes encompass source files that are spread across many directories. As a result, in order to utilize the wide compile technique, current makefiles, which are often difficult to develop, test and implement, would have to be restructured.

Therefore a need exists for a compiler that performs wide compilations without the need to change or restructure current makefiles.

SUMMARY

The present application provides a method for generating executable program code from source code stored in several modules. The method includes processing the source code using a compiler that generates ordinary and intermediate object code. The intermediate object code is preferably stored in at least one intermediate object code file. The ordinary and intermediate object code are then linked by a link editor to generate executable program code.

Typically, intermediate object code is generated in response to an option, such as a command line option, passed to the compiler. The executable program code is generated using inline substitution and by passing function arguments in registers.

The present application also provides a program translator used to generate executable program code from source code in several different modules. The translator includes a compiler that generates ordinary and intermediate object code, and that links the ordinary and intermediate object code to generate executable program code.

BRIEF DESCRIPTION OF THE DRAWINGS

Preferred embodiments of the invention are described hereinbelow with reference to the drawings wherein:

FIG. 4 is a flow diagram of the compiler of the present application and a link editor for generating executable program code from ordinary and intermediate object code.

DETAILED DESCRIPTION

The present invention relates to a compiler that is capable of performing wide compile functions while eliminating the need to restructure existing makefiles. The compiler of the present application includes an intermediate compile mechanism that can be embedded in the compiler or that can be called by the compiler to perform wide compile functions. With the intermediate compile mechanism of the present application, wide compile functions can be performed when the source files (or modules) are in multiple directories, when some of the called modules are in library archive files, when different command line options are required for modules that need to be compiled together, and/or when site specific control of some or all inline substitutions is needed.

Figure 1:
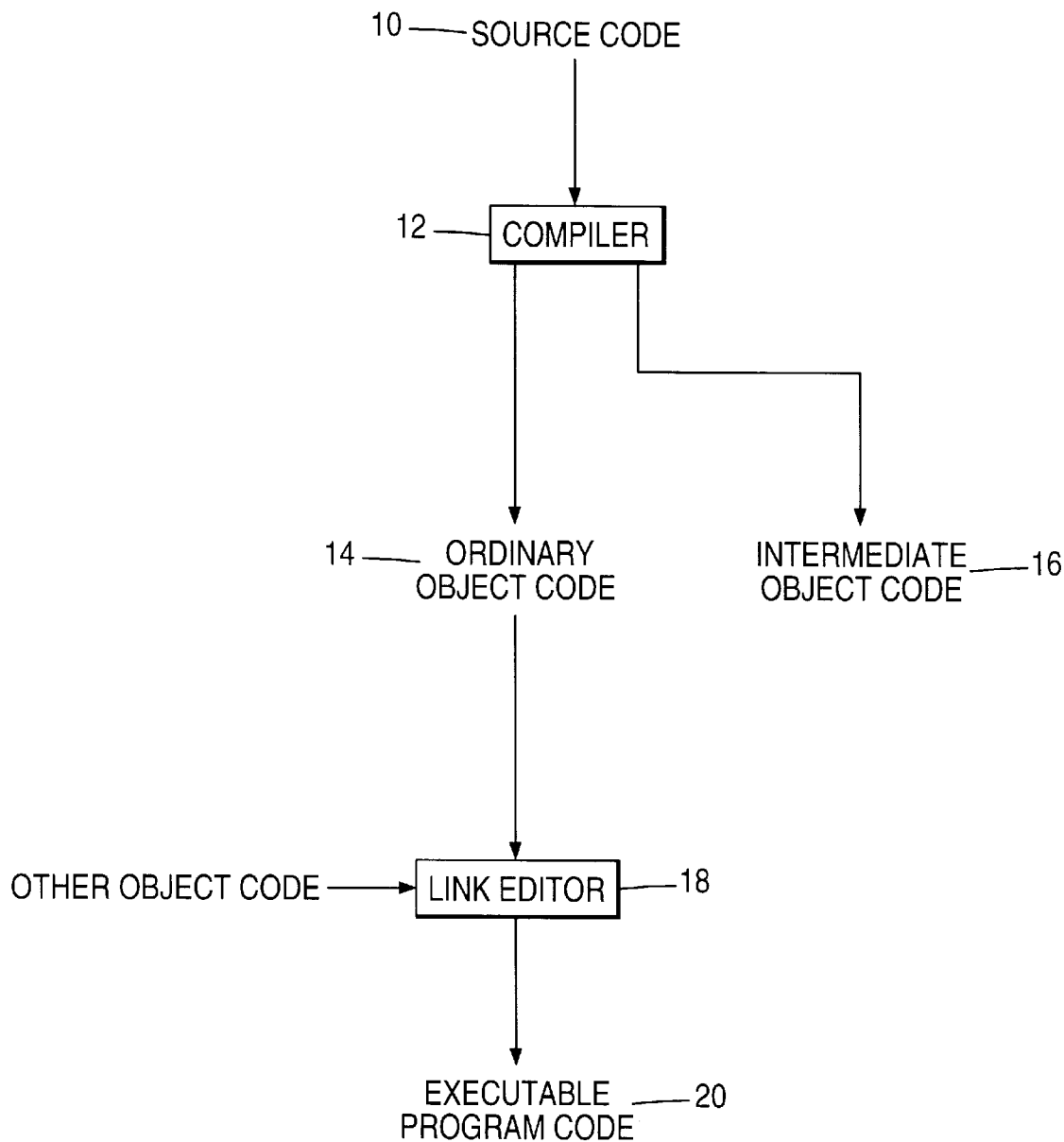
FIG. 1 is a block diagram of the flow for translating source code to executable program code.

Referring to FIG. 1, a flow diagram for translating source code to executable program code is shown. As seen in FIG. 1, source code 10 is converted to ordinary object code 14 or intermediate object code 16 by a compiler 12. The ordinary object code 14 is combined with other object code from, for example other compilations, by a link editor 18. The link editor converts the combined object code to executable program code 20. Intermediate object code 16 is temporarily stored and later converted by the compiler to executable code. The terms ordinary and intermediate object code are used herein to designate two types of object code created by the compiler and subsequently combined by the link editor to form executable program code. Ordinary object code is generated by the compiler in a similar manner as conventional compilers. Intermediate object code is generated by the compiler when performing wide compilation functions.

Figure 2:
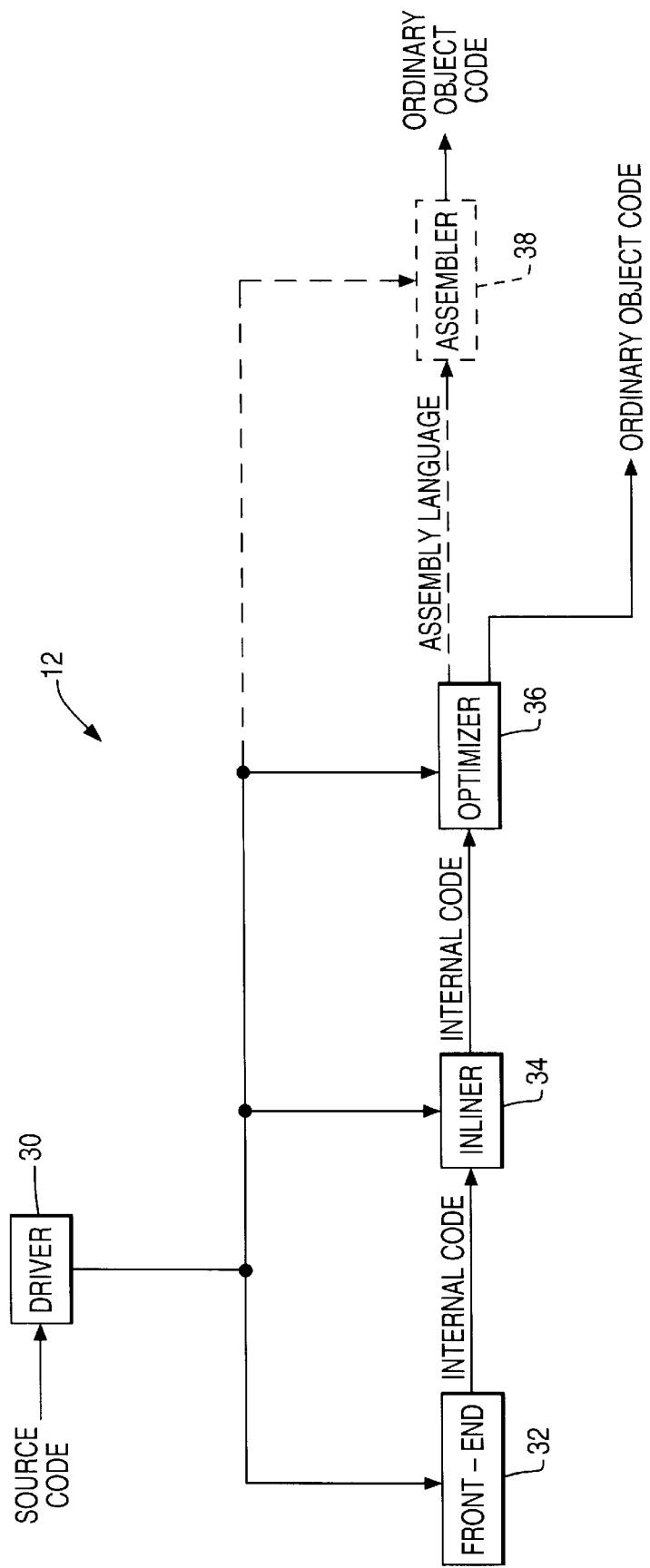
FIG. 2 is a flow diagram of the compiler of FIG. 1 for generating ordinary object code.
Figure 3:
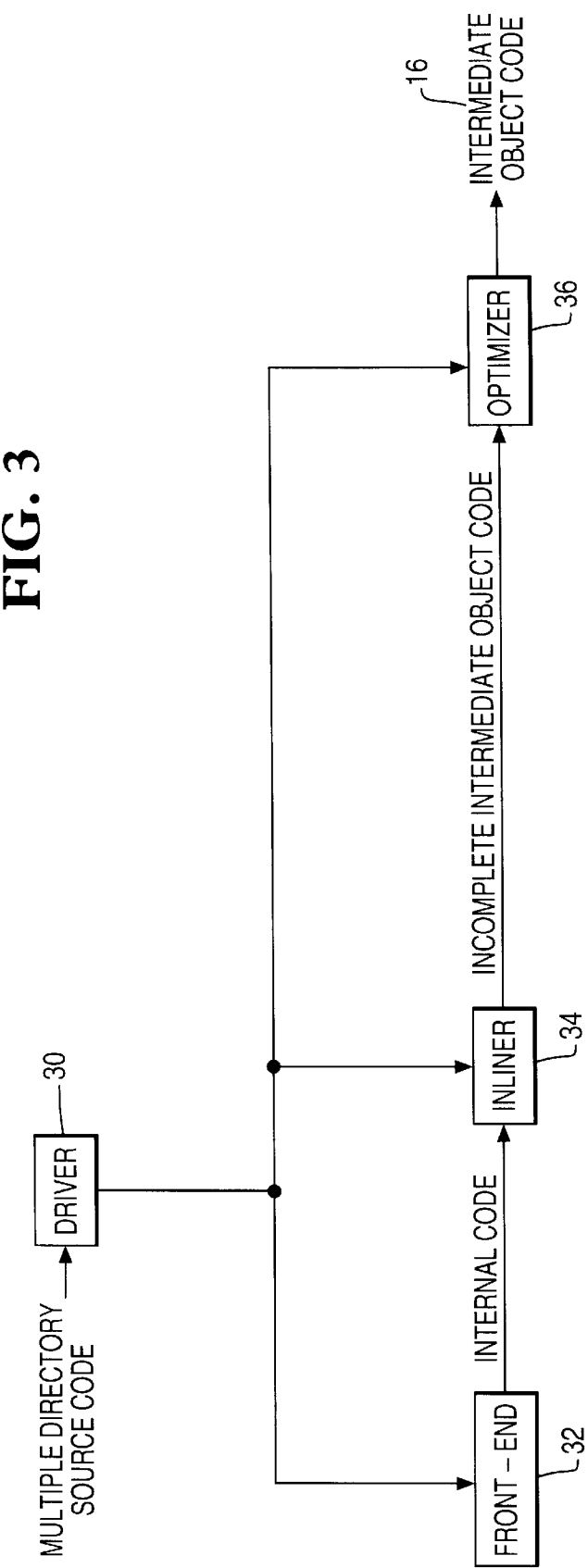
FIG. 3 is a flow diagram of the compiler of FIG. 1 for generating intermediate object code.

The compiler 12 of the present application uses a compiler driver program and multiple compiler modules to translate the source code to ordinary object code and intermediate object code. The functions or processes performed by each module may differ depending upon whether ordinary or intermediate object code is being generated. FIG. 2 illustrates a flow diagram for the compiler of the present application when generating ordinary object code. FIG. 3 illustrates a flow diagram for the compiler of the present application when generating intermediate object code. An example of a compiler having a suitable compiler driver program is the SCDE 3.02 compiler developed by the NCR Corporation which is used in UNIX based systems. However, other compiler modules or components that may be used with other operating systems are also contemplated. Such compiler components or modules include drivers, front ends, inliners, optimizers and link editors. It should be noted that incorporation of the features of the subject application into existing compilers is made easier if an inliner is accessible by the compiler driver.

It should be noted that FIGS. 2–4 illustrate functional representations of one environment for supporting cross-module inline substitutions and argument passing in registers. However, those skilled in the art would recognize other environments that can be modified to support cross-module inline substitutions and argument passing in registers.

Referring to FIG. 3, for intermediate compilation, the driver program 30 recognizes an option that specifies that an intermediate compile is to be performed. The option may be, for example, a command line option passed to the compiler driver by a user. As noted above, an example of the compiler having a suitable compiler driver program is the SCDE 3.02 compiler which is used in a UNIX based system. The compiler driver program in this exemplary compiler recognizes command line options which call upon the intermediate compile mechanism of the present application. An example of a suitable command line option is "-ilobj" which is used in the above-mentioned UNIX based compiler. Upon recognizing the command line option to perform intermediate compilation, the compiler driver program 30 generates intermediate object files.

Referring to FIGS. 2 and 3, the compiler driver program 30 responds to command line instructions that call upon the various compiler modules or facilities. One module used in the compiler 12 of the present application is a front-end module 32 that transforms the source code into internal code which is an intermediate form of object code. The front-end module 32 performs this process whether ordinary or intermediate object code is being generated. Such front-end modules are known.

A second module used in the compiler 12 of the present application is an inliner module 34. The inliner 34 performs different functions when ordinary object code is being generated as opposed to when intermediate object code is being generated. For example, when ordinary object code is being generated, illustrated in the flow diagram in FIG. 2, the inliner 34 replaces various function calls in the source code transformed by the frontend module 32 with the body of the function. Preferably, the inliner replaces the function call with the body of the function when the called function meets predefined conditions. These conditions are typically specified by the compiler user. Examples of these conditions include: functions with less than a predefined number of intermediate code nodes in their representations; functions whose stack usage requirements are less than a predefined number of bytes; and functions that are called less than a predefined number of times.

When generating intermediate object code, illustrated in the flow diagram in FIG. 3, the inliner builds a symbol table into the internal code generated by the front-end module 32. The output of the inliner 34 when generating intermediate object code is an incomplete form of intermediate object code.

A third module used by the compiler 12 of the present application is an optimizer module 36. The optimizer 36 performs different functions when ordinary object code is being generated as opposed to when intermediate object code is being generated. For example, when ordinary object code is being generated, illustrated in the flow diagram in FIG. 2, the optimizer 36 translates the internal code generated by the front-end module 32 and the inliner 34 to improve the structure of the final executable program 20. For example, the optimizer module 36 may improve the structure of the executable program so as to improve program efficiency and reduce execution times of the program. Examples of functions performed by the optimizer include computing common sub-expressions once, removing constant operations from loops, and optimizing the use of registers. More sophisticated optimization techniques are also known and contemplated for the compiler of the present application. If the output of the optimizer module 36 is in for example assembly language instead of object code, the compiler can include an assembler 38 that converts the assembly language into object code. The ordinary object code is loaded into ordinary object files. Typically, one ordinary object file is created for each source file.

When intermediate object code is being generated, illustrated in the flow diagram in FIG. 3, the optimizer 36 reads command line options from the driver 30 and includes the command line options in the incomplete intermediate object code file to create intermediate object code 16. That is, the output of the optimizer 36 in FIG. 3 is intermediate object code which is loaded into intermediate object files.

Referring to FIG. 4, after the ordinary and intermediate object files are referenced, the driver 30 generates and passes a command line to the link editor 18 that intermediate object files are to be recognized. The link editor, identified as 18a in FIG. 4, then generates lists of the ordinary object files and stores them in one file, and lists of intermediate object files and stores them in another file. The intermediate object files typically have similar symbol tables to those that ordinary object files would have and can be processed with similar tools that operate on ordinary object files.

After the link editor creates the lists, the driver 30 generates and passes a command line to the inliner 34 which instructs the inliner to process the internal code in the intermediate object files. If the source code transformed by the front-end module 32 (i.e., the internal code) in any of the intermediate object files satisfies predefined conditions, the inliner module 34 then replaces calls in the transformed source code with the body of the function called. Arguments that are to be passed are stored in registers to minimize input/output memory transactions times. It should be noted that the inliner at this stage is processing internal code from many intermediate object files at one time.

As noted above, controlling conditions or commands may be used to limit which intermediate object files are passed to the inliner. Examples of these controlling commands include:

1. The -Hic=<number> option tells the inliner that it may put inline only those functions that are called less than <number> times.

2. The -His=<size> option tells the inliner that it may put inline only those functions whose stack usage requirements are less than <size> bytes.

3. The -Hit=<count> option tells the inliner that it may put inline only functions with less than <count> intermediate code nodes in their representations.

Command lines that build executables from intermediate object files can specify values for the three inline substitution control limits. An example of a command line is:

cc -o xyz -ilobj -Hit=128 dirx/x.o diry/y.o dirz/z.o.

This command line specifies that functions with up to 128 intermediate language nodes can be put inline in executable program xyz. All function calls in intermediate object files that are passed to the inliner that meet the conditions of the command line are replaced with the body of the function and for the other function calls arguments are passed in registers.

Referring again to FIG. 4, after inline substitution, the driver 30 generates and passes to the optimizer 36 at least one command line (one for each intermediate file) which instructs the optimizer to take the output of each intermediate object file and to separately improve the program structure for each intermediate object file. The output of the optimizer is temporary ordinary object code.

After optimization, the driver 30 generates and passes at least one command line to the link editor, identified as 18b in FIG. 4, to link the ordinary and temporary ordinary object code so as to form the executable program code.

An example for building intermediate object code files which can be implemented with the UNIX based compiler discussed above, will now be described. As noted, intermediate compilation can be specified by command line option. Activating intermediate compilation produces object files (which can be identified as ".o" files) that contain the compiler's internal code representation for a program module being compiled. For example, the following command lines, can be processed by the above described UNIX based compiler driver program:

cc -c -ilobj . . . dirx/x.c
cc -c -ilobj . . . diry/y.c
cc -c -ilobj . . . dirz/z.c These command lines can be used to build intermediate object files dirx/x.o, diry/y.o, and dirz/z.o, respectively. Each of the above three command lines can have different options. Portions of these options that apply to the compiler's optimizer are stored in the intermediate object file and applied when the final intermediate object code is combined with ordinary and other intermediate object code into executable program code. The following command line:

cc -o xyz -ilobj dire/x.o diry/y.o dirz/z.o results in the intermediate object code for x.c, y.c and z.c being presented to the inliner at the same time. The temporary object code files that are the result of inline substitutions and argument passing in registers are each compiled separately with desired optimizer options and are used to build executable program code xyz. If the object file diry/y.o in this example is an ordinary object code file, then stored internal code from the intermediate object files dirx/x.o and dirz/z.o are presented to the inliner, and the ordinary object code for y.o is linked with the temporary object code for the x.c and z.c source files to generate executable program xyz.

It will be understood that various modifications can be made to the embodiments of the present invention herein without departing from the spirit and scope thereof. Therefore, the above description should not be construed as limiting the invention, but merely as preferred embodiments thereof. Those skilled in the art will envision other modifications within the scope and spirit of the invention as defined by the claims appended hereto.

What is claimed:

1. A method for generating executable program code from source code stored in multiple directories, comprising:

processing source code using a compiler having an intermediate compile mechanism, to generate ordinary and intermediate object code, wherein said compiler includes a front-end, an inliner, an optimizer and a driver which generates and passes options to said front-end, inliner and optimizer;

wherein said intermediate object code is generated by processing source code from multiple directories, such that source code from each directory is processed by said front-end to generate internal code, said internal code is then processed using said inliner such that inline substitutions are made, function arguments to be passed between the multiple directories are stored in registers and symbol tables are attached to said internal code, and said processed internal code is then processed so that options are attached to said internal code using said optimizer; and linking said ordinary and intermediate object code to generate executable program code.

2. The method according to claim 1, wherein said ordinary object code is generated by processing source code using said front-end to generate internal code, said internal code is processed by said inliner using inline substitutions and by passing arguments in registers, and said optimizer processes said internal code processed by said inliner to form said ordinary object code.

3. The method according to claim 1, wherein temporary ordinary object code is generated by processing said intermediate object code using said inliner and said optimizer.

4. The method according to claim 3 wherein temporary ordinary object code is linked to said ordinary object code to form said executable program code.

5. The method according to claim 3, wherein said temporary ordinary object code is generated by processing said intermediate object code such that said inliner performs inline substitutions and argument passing in registers, and said optimizer processes said internal code processed by said inliner to form said temporary ordinary object code.

6. A program translator for generating executable program code from source code stored in multiple directories, comprising:

a compiler that generates ordinary and intermediate object code, said compiler having a front-end, an inliner, an optimizer and a driver capable of generating and passing options to said front-end, inliner and optimizer;

wherein said intermediate object code is generated by processing source code from multiple directories, such that source code from each directory is processed by said front-end to generate internal code, said internal code is then processed using said inliner such that inline substitutions are made, function arguments to be passed between the multiple directories are stored in registers and symbol tables are attached to said internal code, and said processed internal code is then processed so that options are attached to said internal code using said optimizer; and a link editor that links said ordinary and intermediate object code to generate executable program code.

7. The program translator according to claim 6, wherein said ordinary object code is generated by processing source code using said front-end to generate internal code, said internal code is processed by said inliner using inline substitutions and by passing arguments in registers, and said optimizer processes said internal code processed by said inliner to form said ordinary object code.

8. The program translator according to claim 6, wherein temporary ordinary object code is generated by processing said intermediate object code using said inliner and said optimizer.

9. The program translator according to claim 8, wherein temporary ordinary object code is linked to said ordinary object code to form said executable program code.

10. The program translator according to claim 9, wherein temporary ordinary object code is generated by processing said intermediate object code such that said inliner performs inline substitutions and argument passing in registers, and said optimizer processes said internal code processed by said inliner to form said temporary ordinary object code.

* * * * *